US006948275B1

(12) United States Patent
Lehmann

(10) Patent No.: US 6,948,275 B1
(45) Date of Patent: Sep. 27, 2005

(54) SNAP SWIVEL ASSEMBLY INCLUDING BEARING FOR FISHING LINE

(76) Inventor: Roger W. Lehmann, 808 Ashley Ave., Brielle, NJ (US) 08730

( * ) Notice: Subject to any disclaimer, the term of this patent is extended or adjusted under 35 U.S.C. 154(b) by 167 days.

(21) Appl. No.: 10/802,707

(22) Filed: Mar. 17, 2004

(51) Int. Cl.⁷ .......................................... A01K 91/00
(52) U.S. Cl. ...................................... 43/43.1; 24/908
(58) Field of Search ..................... 43/42.29, 42.08, 43/44.83; 24/908

(56) References Cited

U.S. PATENT DOCUMENTS

| | | | | |
|---|---|---|---|---|
| 1,856,043 | A | * | 4/1932 | Pflueger ...................... 43/44.86 |
| 2,561,144 | A | * | 7/1951 | Seaton ........................... 403/78 |
| 4,798,022 | A | * | 1/1989 | Rhoades ..................... 43/44.83 |
| 5,781,972 | A | * | 7/1998 | Steed ........................... 43/44.83 |
| 5,926,996 | A | * | 7/1999 | Frazier ........................ 43/43.1 |
| 5,953,849 | A | * | 9/1999 | Boucher, Jr. ............... 43/42.24 |
| 6,101,755 | A | * | 8/2000 | Kent .............................. 43/4.5 |
| 6,588,075 | B2 | * | 7/2003 | Calvani ...................... 24/599.4 |

OTHER PUBLICATIONS www.barlowstackle.com/swivels-snaps.html, Barlow's Tackle Express, Jun. 11, 2004.
www.captharry.com/hooks-tackle.html, Capt. Harry's Fishing Supply, Jun. 11, 2004.
www.captharry.com/hooks.html, Capt. Harry's Fishing Supply, Jun. 11, 2004.

* cited by examiner

Primary Examiner—Michael J. Carone
Assistant Examiner—Bethany L. Griles
(74) Attorney, Agent, or Firm—Caesar, Rivise, Bernstein, Cohen & Pokotilow, Ltd.

(57) ABSTRACT

A terminal tackle for securing a fishing lure to a fishing line and wherein the terminal tackle includes a slidable/rotatable ring that is trapped to a swivel portion of the terminal tackle and whereby a bearing is trapped to the ring but is slidable on and rotatable about the ring and wherein the bearing receives the fishing line therein. The fishing line is then crimped to secure the fishing line within the bearing.

3 Claims, 3 Drawing Sheets

SNAP SWIVEL ASSEMBLY INCLUDING BEARING FOR FISHING LINE

BACKGROUND OF THE INVENTION

1. Field of Invention

This invention relates to fishing equipment and, more particularly, to a method used to attach terminal devices to the end of fishing line.

2. Description of Related Art

One problem experienced by fisherman is to make certain that their fishing line is terminated in a manner that will not lead to failure during their attempt to catch a fish. This is even more of a consideration in sportfishing when the targeted species of fish are large and powerful such as for marlin, tuna and sharks. The fishing tackle system is no stronger than the weakest connection, and in most cases, that is the connection made by terminating the fishing line to the terminal tackle known as a swivel or snap clip. FIG. 1 depicts a conventional terminal tackle 1. In particular, the terminal tackle 1 comprises a swivel portion 2 having a snap loop 3 to which a lure having a leader (neither of which are shown) can be releasably coupled. At the other end of the swivel portion 2 is ring 4 that is trapped, but rotatable and slidable, inside a fitting 5. It is around this ring 4 that the fishing line 6 is formed into a knot 7 in order to couple the terminal tackle 1 thereto.

However, the stresses in knots 7 tied in fishing line 6 at the attachment to the terminal tackle 1, in many cases, result in the failure or line breakage at the knot 7. In addition, the slight constant movement, under pressure of the terminal tackle 1, where it is attached at the knot 7 abrades the line 6, further weakening it and fishing line failure results.

One attempt to solve this problem is to attach the fishing line 6 to the terminal tackle 1 without the use of knots. FIG. 2 depicts this configuration. This is accomplished by inserting the fishing line 6 thru a hollow sleeve 8 (e.g., Sevenstrand leader metal sleeves, such NP-31-0062), around the ring 4 on the terminal tackle 1, back thru the hollow sleeve 8 and then with a special tool (e.g., Jinkai crimping tool NP31-3019 or NP-31-6148) squeezing the sleeve 8 tightly around the fishing line 6, forming a secure connection. This eliminates failure from the stresses caused in the fishing line by the knots 7; however it doesn't solve the problem of the slight constant movement, under pressure of the terminal tackle 1 where it is attached to the line 6. The constant movement under pressure from fighting the fish and abrasion from the connection point 9 continues to weaken the fishing line 6 and causes failure at the connection point 9.

Thus there remains a need to solve the problem of a secure, fail-safe attachment method of the fishing line 6 to the terminal tackle 1.

All references cited herein are incorporated herein by reference in their entireties.

BRIEF SUMMARY OF THE INVENTION

A terminal tackle for use with a fishing line and including a swivel portion having a ring that is trapped, but slidable on and rotatable about said swivel portion and wherein the terminal tackle further comprises: a bearing (e.g, a grommet) for receiving the fishing line therein, wherein the bearing is trapped, but slidable on and rotatable about the ring; and a hollow sleeve that is crimped around the fishing line to secure the fishing line in the bearing.

A method for reducing the stress and abrasion of a fishing line coupled to a terminal tackle that holds a lure thereto. The method comprises the steps of: providing a terminal tackle having a swivel portion that includes a slidable and rotatable ring trapped to the swivel portion; trapping a bearing to the ring wherein the bearing is slidable on and rotatable about the ring; positioning the free end of the fishing line around the bearing; and crimping the free end of the fishing line to the remainder of the fishing line, thereby trapping the fishing line in the bearing.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention will be illustrated in more detail with reference to the following examples, but it should be understood that the present invention is not deemed to be limited thereto.

Figure 1:
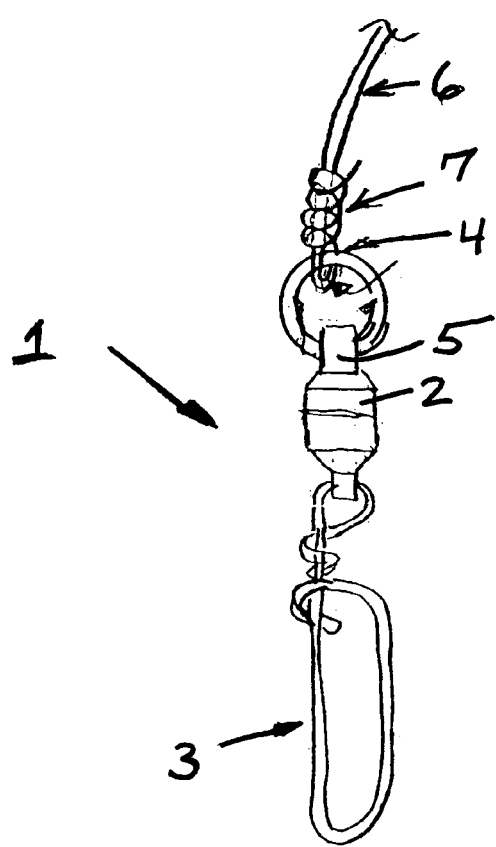
FIG. 1 is a conventional terminal tackle shown coupled to a fishing line using a knot.
Figure 2:
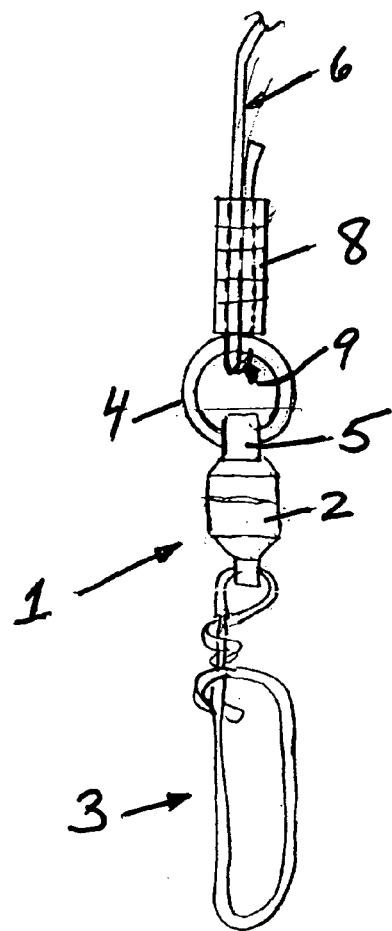
FIG. 2 is a conventional terminal tackle shown coupled to a fishing line using a hollow sleeve that is crimped.
Figure 3:
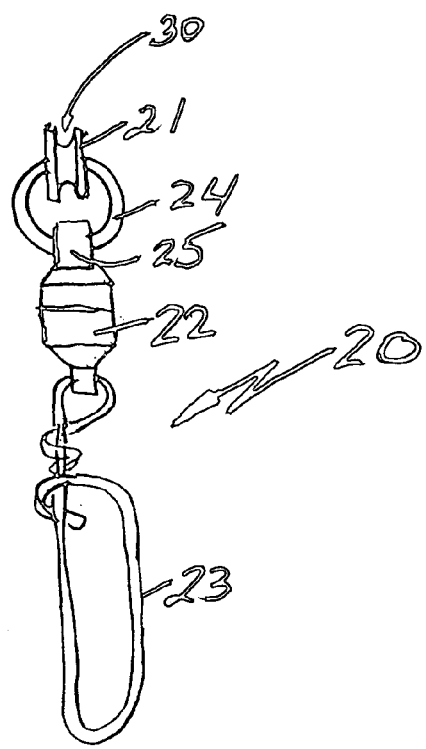
FIG. 3 depicts the terminal tackle of the present invention using a bearing that is coupled to the ring portion of the terminal tackle.
Figure 4:
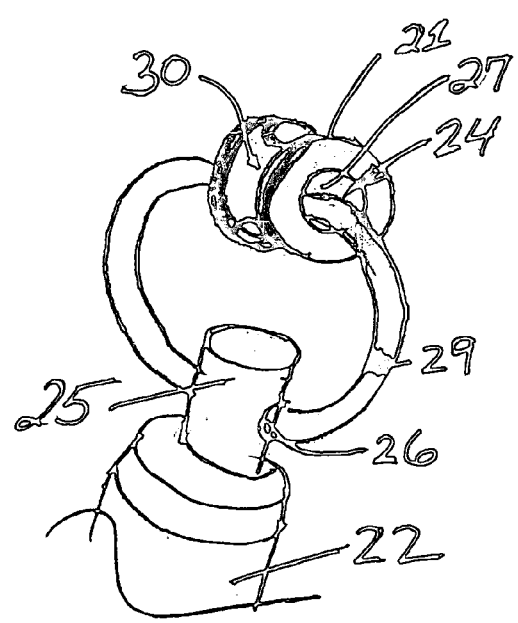
FIG. 4 is an enlarged partial view of the swivel portion of the present invention showing the bearing trapped, but slidable, on the ring.

FIG. 3 depicts the present invention 20 whereby the terminal tackle includes a bearing 21 that is trapped but slidable on the ring 24 of the terminal tackle; as shown, the present invention 20 includes a swivel portion 22 having a snap loop 23 to which a lure having a leader (neither of which are shown) can be releasably coupled. At the other end of the swivel portion 22 is ring 24 that is trapped, but slidable, inside a fitting 25. However, unlike the prior art, the bearing 21 (e.g., a grommet) is trapped, but slidable, on the ring 24. The bearing 21, shaped like a small grooved pulley, and made from a strong material, e.g., Delrin® plastic or metal-like brass, aluminum or stainless steel, comprises a channel 30 for receiving the fishing line 6. This bearing 21 is attached to the swivel portion 22 by use of a intermediate welded ring 24 (see weld point 29) that passes thru the center hole 27 of the bearing 21 and also passes thru a hole 26 in the swivel fitting 25, making for a permanent attachment between the bearing 21 and swivel portion 22.

Figure 5:
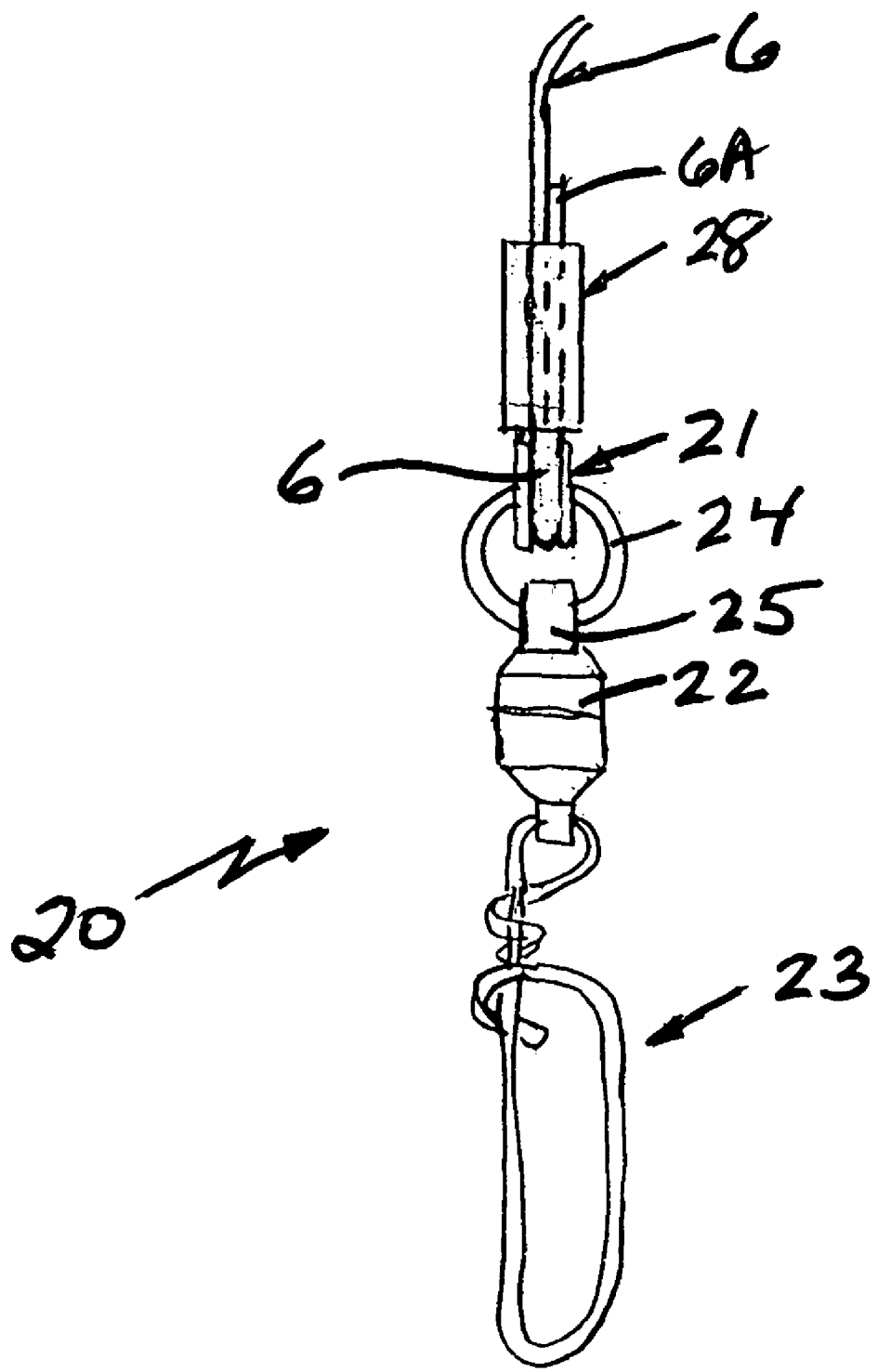
FIG. 5 depicts the present invention coupled to a fishing line.

As shown in FIG. 5, the fishing line 6 is attached around the bearing 21 and secured to the bearing 21 utilizing the method of crimping a hollow sleeve 28 (e.g., Sevenstrand leader metal sleeves, such NP-31-0062) around the line 6; any well-known crimping tool (e.g., Jinkai crimping tool NP31-3019 or NP-31-6148) can be used to crimp the sleeve 28 around the fishing line 6. As can be clearly seen in FIG. 5, the free end 6A of the line is fed through the sleeve 28, around the bearing 21 and in the channel 30 and then back through the hollow sleeve 28 which is then crimped tightly to secure the fishing line 6 to the bearing 21.

Thus, as shown in FIG. 5, the direct attachment of the fishing line 6 to the bearing 21 removes the stress from the fishing line 6 at this point because the line 6 is no longer attached to the terminal tackle, thereby eliminating the movement and stresses in such connection as discussed earlier. The bearing 21 is free to rotate and slide on the connecting ring 24 and it withstands all the stresses and wear associated with such connection and eliminates line failure at the terminal attachment.

While the invention has been described in detail and with reference to specific examples thereof, it will be apparent to one skilled in the art that various changes and modifications can be made therein without departing from the spirit and scope thereof.

What is claimed is:

1. A terminal tackle for use with a fishing line and including a swivel portion having a ring that is trapped, but slidable on and rotatable about said swivel portion, said terminal tackle further comprising:
   a pulley having a channel for receiving the fishing line therein, said pulley being trapped, but slidable on and rotatable about said ring; and
      a hollow sleeve that is crimped around the fishing line to secure the fishing line in said pulley.

2. A method for reducing the stress and abrasion of a fishing line coupled to a terminal tackle that holds a lure thereto, said method comprising the steps of:
   providing a terminal tackle having a swivel portion that includes a slidable and rotatable ring trapped to said swivel portion;
   trapping a bearing to said ring wherein said bearing is slidable on and rotatable about said ring, said bearing being shaped to have a pulley form which includes a channel;
   positioning the free end of the fishing line around said bearing; and
   crimping said free end of the fishing line to the remainder of the fishing line, thereby trapping the fishing line in said bearing.

3. The method of claim 2 wherein said step of positioning the free end of the fishing line around said bearing comprises disposing the fishing line inside said channel.

* * * * *